US 11,680,525 B2

(12) United States Patent
Martin et al.

(10) Patent No.: US 11,680,525 B2
(45) Date of Patent: Jun. 20, 2023

(54) LUBRICANT FILTER FOR A TURBINE ENGINE

(71) Applicant: Pratt & Whitney Canada Corp., Longueuil (CA)

(72) Inventors: Bruno Martin, Saint-Jean-sur-Richelieu (CA); Michel Desjardins, St. Hubert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/407,991

(22) Filed: Aug. 20, 2021

(65) Prior Publication Data

US 2023/0060048 A1 Feb. 23, 2023

(51) Int. Cl.
*F02C 7/06* (2006.01)
*F16C 33/10* (2006.01)
*F02C 7/28* (2006.01)
*F16H 57/04* (2010.01)

(52) U.S. Cl.
CPC ............... *F02C 7/06* (2013.01); *F02C 7/28* (2013.01); *F16C 33/105* (2013.01); *F16C 33/1045* (2013.01); *F16H 57/0404* (2013.01); *F05D 2240/50* (2013.01); *F05D 2240/55* (2013.01); *F16C 2360/23* (2013.01)

(58) Field of Classification Search
CPC ............ F16H 57/0402; F16H 57/0404; F16C 33/667; F16C 33/105; F02C 7/06; F01D 25/18; F01D 25/186
See application file for complete search history.

(56) References Cited

U.S. PATENT DOCUMENTS

| 4,183,591 A | * | 1/1980 | Mayer | F16N 39/06 384/473 |
| 4,714,139 A | * | 12/1987 | Lorenz | F16N 39/06 184/6.24 |
| 5,391,125 A | * | 2/1995 | Turra | F16H 1/2836 475/331 |

(Continued)

FOREIGN PATENT DOCUMENTS

| JP | H0953433 A | * | 2/1997 |
| WO | 2015047515 A2 | | 4/2015 |

OTHER PUBLICATIONS

Korane, Ken. How does an O-ring seal work. Fluid Power World. Dec. 4, 2015. https://www.fluidpowerworld.com/how-does-an-o-ring-seal/ (Year: 2015).*

(Continued)

Primary Examiner — Topaz L. Elliott
(74) Attorney, Agent, or Firm — Getz Balich LLC

(57) ABSTRACT

An assembly is provided for a turbine engine. This turbine engine assembly includes a journal bearing and a filter. The journal bearing has an internal bearing bore. The filter is arranged within the internal bearing bore. The filter includes a tubular filter element and a first end cap. The tubular filter element extends axially along an axis between a first end and a second end. A perforated portion of the tubular filter element is radially disposed away from the journal bearing by a cavity. The first end cap is mounted to the tubular filter element at the first end. The first end cap is sealed radially against the journal bearing by a first interference fit.

17 Claims, 6 Drawing Sheets

(56) References Cited

U.S. PATENT DOCUMENTS

| | | | |
|---|---|---|---|
| 6,416,561 B1 | 7/2002 | Kallsen | |
| 8,113,716 B2* | 2/2012 | Kikuchi | F02F 7/0053 |
| | | | 384/473 |
| 8,246,503 B2 | 8/2012 | Sheridan | |
| 8,298,108 B2 | 10/2012 | Nishida | |
| 8,398,517 B2* | 3/2013 | McCune | F16H 57/0404 |
| | | | 475/159 |
| 8,777,793 B2* | 7/2014 | Sheridan | F01D 25/16 |
| | | | 475/331 |
| 8,894,529 B2 | 11/2014 | McCune | |
| 8,899,916 B2* | 12/2014 | McCune | F02K 3/04 |
| | | | 416/170 R |
| 8,900,083 B2 | 12/2014 | Sheridan | |
| 10,234,018 B2 | 3/2019 | Hasting | |
| 10,662,879 B2 | 5/2020 | Desjardins | |
| 10,760,677 B2 | 9/2020 | Brillon | |
| 10,935,076 B2 | 3/2021 | Martin | |
| 11,268,453 B1* | 3/2022 | Desjardins | F16H 57/0479 |
| 11,415,050 B2* | 8/2022 | Shigeno | F02C 7/06 |
| 2003/0221911 A1* | 12/2003 | Eriksen | F16C 19/52 |
| | | | 184/6.4 |
| 2006/0063637 A1* | 3/2006 | Law | F16H 57/041 |
| | | | 475/331 |
| 2008/0253709 A1* | 10/2008 | Kikuchi | F16C 33/105 |
| | | | 384/473 |
| 2010/0317477 A1* | 12/2010 | Sheridan | F16C 33/105 |
| | | | 475/159 |
| 2010/0317478 A1* | 12/2010 | McCune | F01D 25/186 |
| | | | 475/159 |
| 2011/0132828 A1 | 6/2011 | Ries | |
| 2014/0294558 A1* | 10/2014 | Haugh | F02C 7/14 |
| | | | 415/115 |
| 2015/0369082 A1* | 12/2015 | Schwarz | F01D 25/20 |
| | | | 415/177 |
| 2019/0234509 A1 | 8/2019 | Desjardins | |
| 2020/0018198 A1* | 1/2020 | Kitamura | F16C 33/105 |
| 2020/0300340 A1 | 9/2020 | Desjardins | |
| 2020/0362755 A1* | 11/2020 | Shigeno | F01M 11/03 |
| 2022/0298974 A1* | 9/2022 | Desjardins | F16H 57/0431 |

OTHER PUBLICATIONS

EP search report for EP22191582.0 dated Feb. 22, 2023.

\* cited by examiner

LUBRICANT FILTER FOR A TURBINE ENGINE

TECHNICAL FIELD

This disclosure relates generally to a rotational equipment and, more particularly, to lubricant filtration for rotational equipment.

BACKGROUND INFORMATION

Rotational equipment such as a gas turbine engine includes filters for filtering lubricant provided to components of the turbine engine. Various types and configurations of lubricant filters are known in the art. While these known lubricant filters have various benefits, there is still room in the art for improvement.

SUMMARY

According to an aspect of the present disclosure, an assembly is provided for a turbine engine. This turbine engine assembly includes a journal bearing and a filter. The journal bearing has an internal bearing bore. The filter is arranged within the internal bearing bore. The filter includes a tubular filter element and a first end cap. The tubular filter element extends axially along an axis between a first end and a second end. A perforated portion of the tubular filter element is radially disposed away from the journal bearing by a cavity. The first end cap is mounted to the tubular filter element at the first end. The first end cap is sealed radially against the journal bearing by a first interference fit.

According to another aspect of the present disclosure, another assembly is provided for a turbine engine. This turbine engine assembly includes a journal bearing and a filter. The journal bearing includes an internal bearing bore, a feed passage and an outlet passage. The feed passage extends radially within the journal bearing to the internal bearing bore. The outlet passage extends radially within the journal bearing out from the internal bearing bore. The filter is arranged within the internal bearing bore with a sealed cavity radially between the filter and the journal bearing. The sealed cavity fluidly coupled with the outlet passage. The filter includes an internal filter bore, an inlet passage and a plurality of perforations. The inlet passage extends radially through the filter and fluidly couples the feed passage to the internal filter bore. The perforations extends radially through the filter and fluidly couple the internal filter bore with the sealed cavity.

According to still another aspect of the present disclosure, a filter is provided that includes a tubular filter element, a first end cap and a second end cap. The tubular filter element extends axially along an axis between a first end and a second end. The tubular filter element includes a first end portion at the first end, a second end portion at the second end, and a perforated portion axially between the first end portion and the second end portion. The tubular filter element is configured from or otherwise includes metal. The first end cap includes a first tubular sidewall and a first endwall. The first tubular sidewall circumscribes and is mounted on the first end portion. The first endwall is connected to the first tubular sidewall and covers the first end. The first end cap is configured from or otherwise includes polymer. The second end cap includes a second tubular sidewall and a second endwall. The second tubular sidewall circumscribes and is mounted on the second end portion. The second endwall is connected to the second tubular sidewall and covers the second end. The second end cap is configured from or otherwise includes polymer.

The filter may include a tubular filter element, a first end cap and a second end cap. The tubular filter element may extend axially along an axis between a first end and a second end. The tubular filter element may be radially disposed away from the journal bearing by the sealed cavity. The first end cap may be mounted on the tubular filter element at the first end. The first end cap may sealingly engage the journal bearing. The second end cap may be mounted on the tubular filter element at the second end. The second end cap may sealingly engage the journal bearing.

The journal bearing may include a cylindrical inner surface. The first end cap may include a cylindrical outer surface pressed radially against the cylindrical inner surface to provide the first interference fit.

The first end cap may be sealed radially against the journal bearing without use of a ring seal.

The first end cap may include a tubular sidewall and an endwall. The tubular sidewall may extend circumferentially about and may be mounted on the tubular filter element. The endwall may cover the first end of the tubular filter element.

The tubular sidewall may be circumferentially and axially uninterrupted.

The tubular sidewall may include an end cap port. The tubular filter element may include an internal filter bore and a filter element port. The filter element port may fluidly couple the end cap port with the internal filter bore.

The journal bearing may include a feed passage that extends to the internal bearing bore. The end cap port may be fluidly coupled with the feed passage.

The first end cap may be configured from or otherwise include polymer.

The filter may also include a second end cap mount to the tubular filter element at the second end. The second end cap may be sealed radially against the journal bearing by a second interference fit.

The cavity may be an annular cavity that extends: radially between the tubular filter element and the journal bearing; and axially between the first end cap and the second end cap.

The journal bearing may include a cylindrical inner surface. A cylindrical surface of the first end cap may be pressed radially against the cylindrical inner surface to provide the first interference fit. A cylindrical surface of the second end cap may be pressed radially against the cylindrical inner surface to provide the second interference fit.

The tubular filter element may be configured from or otherwise include metal.

The journal bearing may include an outlet passage fluidly coupled with the cavity. The outlet passage may extend radially through the journal bearing to an outer side of the journal bearing.

The assembly may also include a gear mounted on and rotatably supported by the journal bearing.

The assembly may also include a carrier to which the journal bearing is mounted.

The assembly may also include an epicyclic geartrain that include the journal bearing and the filter.

The assembly may also include a turbine rotor coupled to an input of the epicyclic geartrain.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
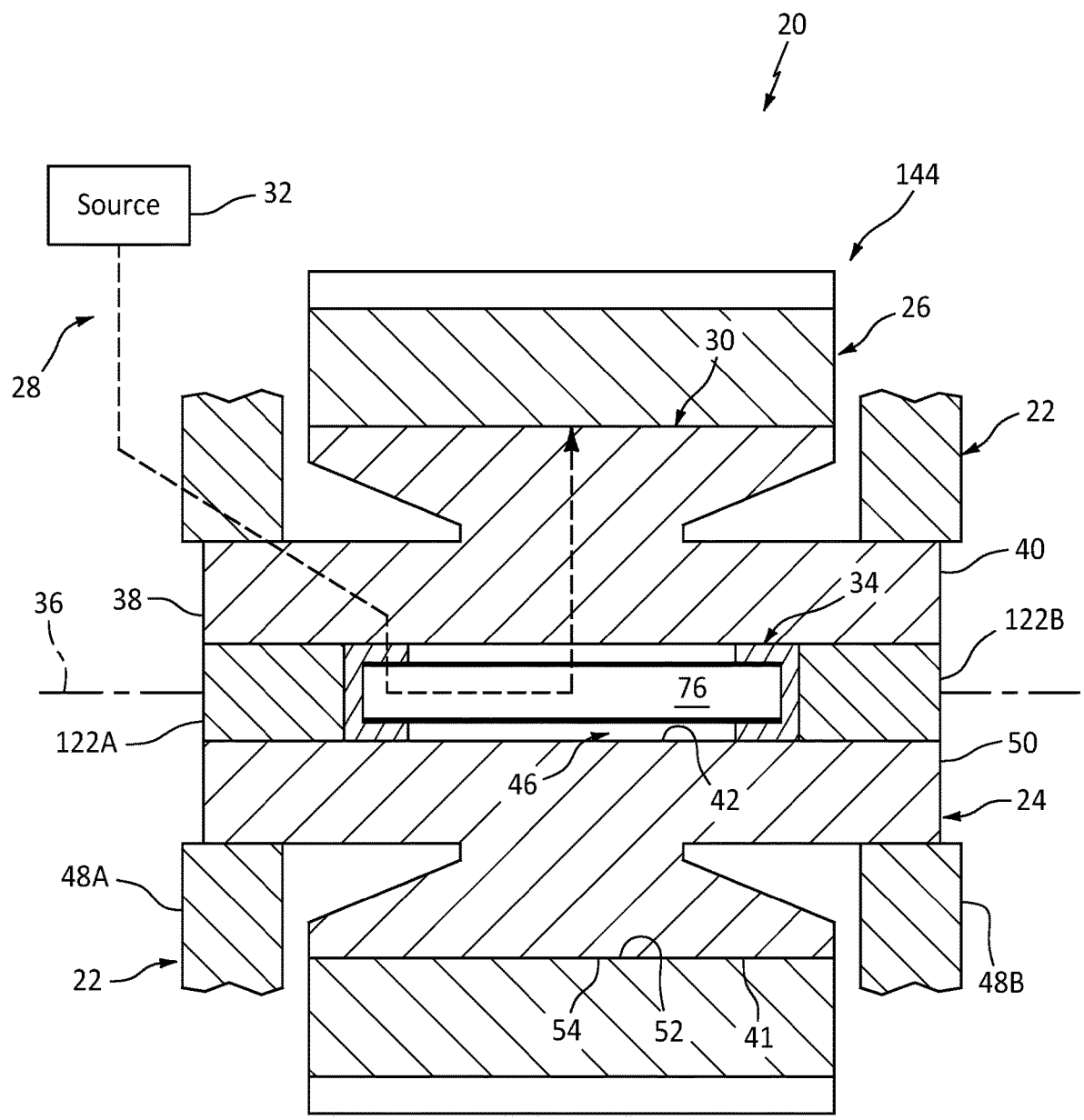
FIG. 1 is a partial side sectional illustration of an assembly for rotational equipment.

FIG. 1 illustrates an assembly 20 for rotational equipment. This rotational equipment may be configured as a gas turbine engine for an aircraft propulsion system, an exemplary embodiment of which is described below in further detail (e.g., see FIG. 9). However, the rotational equipment assembly 20 of the present disclosure is not limited to such an aircraft or gas turbine engine application. The rotational equipment assembly 20, for example, may alternatively be configured with rotational equipment such as an industrial gas turbine engine, a wind turbine, a water turbine or any other apparatus in which a journal bearing is provided for rotatably supporting a rotor.

The rotational equipment assembly 20 of FIG. 1 includes a support structure 22, a journal bearing 24 (e.g., a plain bearing) and a rotor 26. The rotational equipment assembly 20 of FIG. 1 also includes a lubrication system 28 configured to provide lubricant (e.g., oil) to an interface 30 between the rotor 26 and the journal bearing 24. This lubrication system 28 of FIG. 1 includes a lubricant source 32 and a lubricant filter 34; e.g., a last chance filter.

The support structure 22 of FIG. 1 is configured to support the journal bearing 24. This support structure 22, for example, may be configured as a carrier for an epicyclic geartrain. This carrier may be a rotating carrier where the epicyclic geartrain is configured as a planetary geartrain. The carrier may be a stationary carrier where the epicyclic geartrain is configured as a star geartrain. The present disclosure, however, is not limited to such exemplary support structure configurations. The support structure 22, for example, may alternatively be configured as a frame, a case or another housing structure.

The journal bearing 24 of FIG. 1 extends axially along a rotational axis 36 of the rotor 26 between and to a first end 38 of the journal bearing 24 and a second end 40 of the journal bearing 24. The journal bearing 24 extends circumferentially about (e.g., completely around) the rotational axis 36, providing the journal bearing 24 with a full-hoop (e.g., tubular) body. The journal bearing 24 extends radially between and to an inner side 42 of the journal bearing 24 and an outer side 44 of the journal bearing 24. The bearing inner side 42 forms an outer peripheral side of an internal bearing bore 46 within the journal bearing 24. This bearing bore 46 extends axially along the rotational axis 36 within (e.g., into and/or through) the journal bearing 24.

The journal bearing 24 of FIG. 1 is arranged and spans axially between first and second sections 48A and 48B (generally referred to as "48") of the support structure 22. A base 50 of the journal bearing 24 is mounted to the support structure 22. The bearing base 50 of FIG. 1, for example, is fixedly attached to the first and the second sections 48.

The rotor 26 of FIG. 1 is configured to rotate about its rotational axis 36. More particularly, the rotor 26 is mounted on and rotatably supported by the journal bearing 24 at the bearing outer side 44. A cylindrical inner surface 52 of the rotor 26, for example, is engaged with (e.g., contacts) and is slidable circumferentially along a cylindrical outer surface 54 of the journal bearing 24, which bearing outer surface 54 is located at the bearing outer side 44. This interface 30 between the rotor inner surface 52 and the bearing outer surface 54 is lubricated with the lubricant provided by the lubrication system 28 as described below in further detail.

The rotor 26 may be any rotating body within the rotational equipment. The rotor 26, for example, may be a gear such as, but not limited to, an intermediate gear for the epicyclic geartrain. This intermediate gear may be a planet gear where the epicyclic geartrain is configured as the planetary geartrain. The intermediate gear may be a star gear where the epicyclic geartrain is configured as the star geartrain. The present disclosure, however, is not limited to such exemplary rotor configurations. The rotor 26, for example, may alternatively be configured as a wheel, a pulley, a disk, a hub or a shaft.

Figure 2:
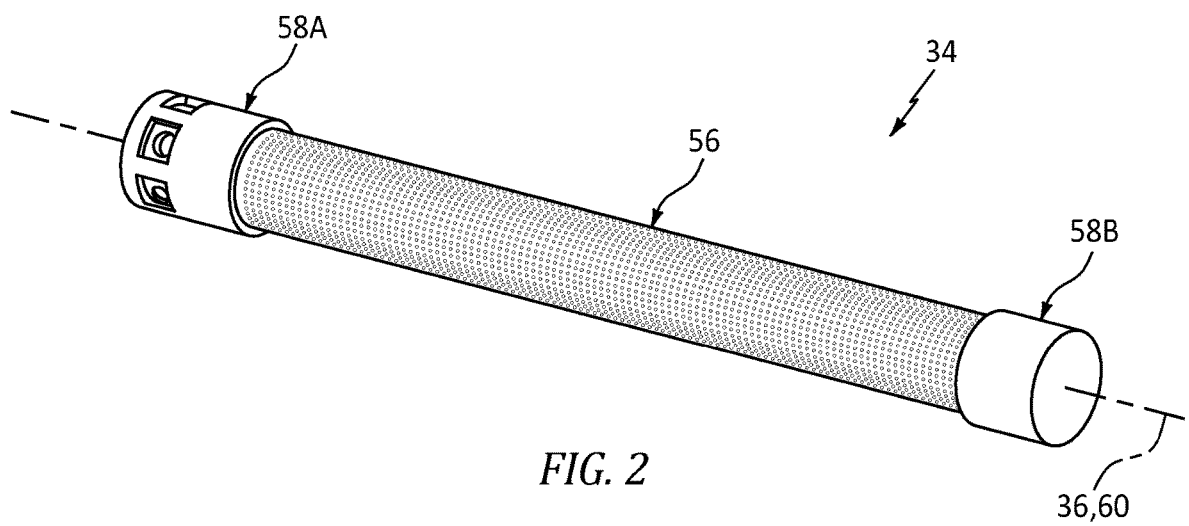
FIG. 2 is a perspective illustration of a lubricant filter.
Figure 3:
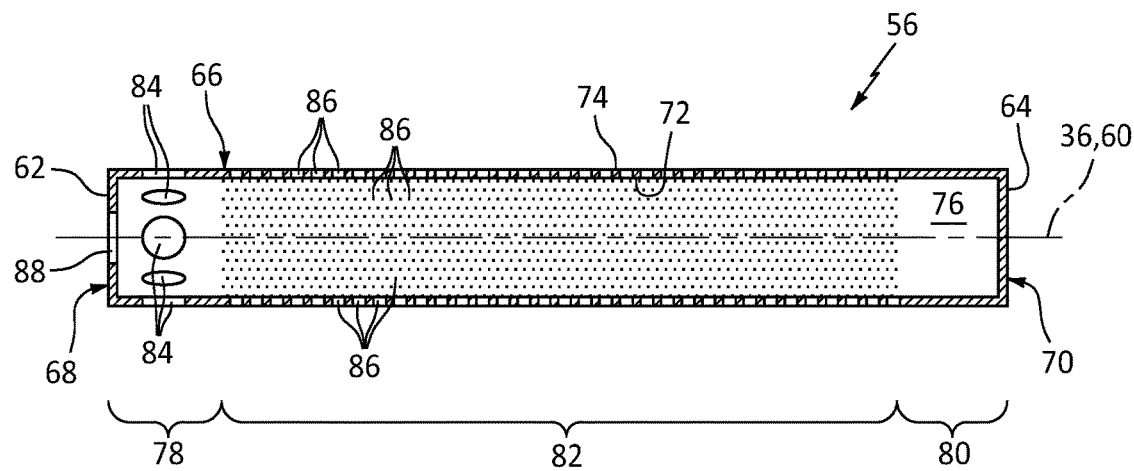
FIG. 3 is a side sectional illustration of a filter element for the lubricant filter.

Referring to FIG. 2, the lubricant filter 34 includes a perforated tubular filter element 56 and one or more filter end caps 58A and 58B (generally referred to as "58"). Referring to FIG. 3, the filter element 56 extends axially along an axis 60 of the lubricant filter 34 between and to a first end 62 of the filter element 56 and a second end 64 of the filter element 56, where the filter axis 60 may be parallel (e.g., coaxial) with the rotational axis 36. The filter element 56 extends circumferentially about (e.g., completely around) the filter axis 60, providing the filter element 56 with a full-hoop (e.g., generally tubular) body.

The filter element 56 includes a tubular filter element sidewall 66. The filter element 56 of FIG. 3 also includes one or more filter element endwalls 68 and 70.

The element sidewall 66 extends axially along the filter axis 60 between and is connected to the first element endwall 68 and the second element endwall 70. The element sidewall 66 extends radially between and to an inner side 72 of the element sidewall 66 and an outer side 74 of the filter element 56. The element sidewall inner side 72 forms an outer peripheral side of an internal filter bore 76 within the lubricant filter 34 and its filter element 56; see also FIG. 1. The element sidewall 66 of FIG. 3 includes an end portion 78, an end portion 80 and an intermediate (e.g., filter) portion 82.

The end portion 78 is located at the element first end 62. This end portion 78 includes one or more filter element inlet ports 84; e.g., apertures. These inlet ports 84 are distributed circumferentially about the filter axis 60 in an annular array. Each of the inlet ports 84 extends radially through the element sidewall 66 and its end portion 78 between and to the element sidewall inner side 72 and the element outer side 74. Each of the inlet ports 84 of FIG. 3 has a rounded (e.g., circular) cross-sectional geometry; however, the present disclosure is not limited thereto.

The end portion 80 is located at the element second end 64. This end portion 80 may be circumferentially and/or axially uninterrupted. The end portion 80 of FIG. 3, for example, is configured without any perforations, ports or other types of apertures extending radially therethrough.

The intermediate portion 82 is located axially along the filter axis 60 between the end portion 78 and the end portion 80. The intermediate portion 82 may be configured as a perforated portion of the filter element 56 and its element sidewall 66. The intermediate portion 82 of FIG. 3, for example, includes a matrix of perforations 86. Each of these perforations 86 extends radially through the element sidewall 66 and its intermediate portion 82 between and to the element sidewall inner side 72 and the element outer side 74. Each of these perforations 86 may have a rounded (e.g., circular) cross-sectional geometry; however, the present disclosure is not limited thereto. Each of the perforations 86 has a dimension (e.g., a diameter, width, etc.) which is sized smaller than a corresponding dimension (e.g., a diameter, width, etc.) of a respective one of the inlet ports 84. The inlet port dimension, for example, may be two times (2×), five times (5×), ten times (10×) greater than the perforation dimension. The present disclosure, however, is not limited to such an exemplary dimensional relationship.

The first element endwall 68 is located at the element first end 62. The first element endwall 68 is configured as an annular member; e.g., an annular flange or an annular rim. The first element endwall 68 of FIG. 3, for example, projects radially inward from the element sidewall 66 to an inner end which forms an opening 88 to the filter bore 76 through the first element endwall 68. The present disclosure, however, is not limited to such an exemplary endwall configuration. For example, in other embodiments, the first element endwall 68 may be configured as a non-perforated wall. In still other embodiments, the first element endwall 68 may be omitted from the filter element 56.

The second element endwall 70 is located at the element second end 64. The second element endwall 70 is configured as a non-perforated wall. The second element endwall 70 thereby covers and encloses an end of the filter bore 76 at the element second end 64. The present disclosure, however, is not limited to such an exemplary endwall configuration. For example, in other embodiments, the second element endwall 70 may be configured as an annular member. In still other embodiments, the second element endwall 70 may be omitted from the filter element 56.

The filter element 56 is constructed form filter element material. This filter element material may be metal such as, but not limited to, stainless steel. The present disclosure, however, is not limited to such an exemplary filter element material construction.

Figure 4:
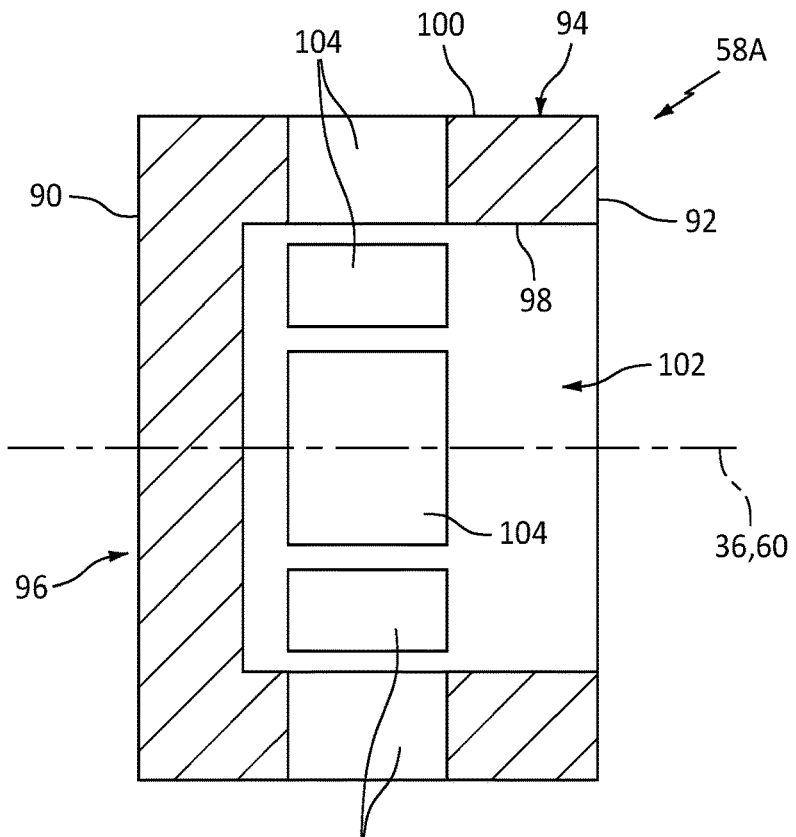
FIG. 4 is a side sectional illustration of an end cap for the lubricant filter.

Referring to FIG. 4, the end cap 58A extends axially along the filter axis 60 between and to a first end 90 of the end cap 58A and a second end 92 of the end cap 58A. The end cap 58A extends circumferentially about (e.g., completely around) the filter axis 60, providing the end cap 58A with a full-hoop body. The end cap 58A includes a tubular sidewall 94 and an endwall 96.

The sidewall 94 projects axially along the filter axis 60 out from the endwall 96 to the end cap second end 92. The sidewall 94 extends radially between and to an inner side 98 of the sidewall 94 and an outer side 100 of the end cap 58A. The sidewall inner side 98 forms an outer peripheral side of a receptacle 102 (e.g., bore) within the end cap 58A. This receptacle 102 projects axially along the filter axis 60 into the end cap 58A from the end cap second end 92 to the endwall 96.

The sidewall 94 of FIG. 4 includes one or more end cap inlet ports 104; e.g., apertures. These inlet ports 104 are distributed circumferentially about the filter axis 60 in an annular array. Each of the inlet ports 104 extends radially through the sidewall 94 between and to the sidewall inner side 98 and the end cap outer side 100. Each of the inlet ports 104 of FIG. 4 has a polygonal (e.g., rectangular) cross-sectional geometry; however, the present disclosure is not limited thereto.

The endwall 96 is connected to the sidewall 94. The endwall 96 is configured as a non-perforated wall. The endwall 96 thereby covers and encloses the receptacle 102.

Figure 5:
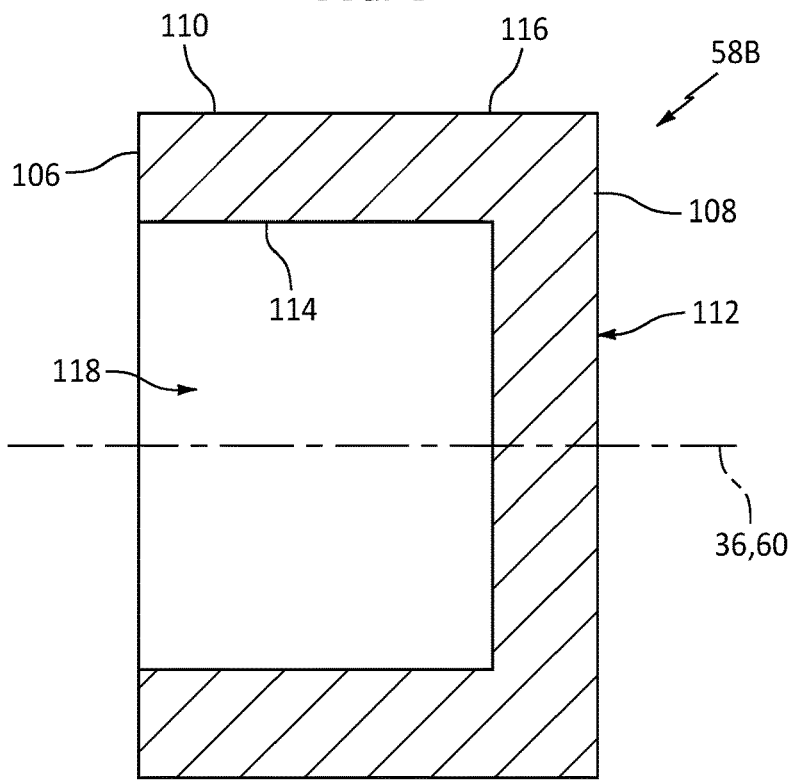
FIG. 5 is a side sectional illustration of another end cap for the lubricant filter.

Referring to FIG. 5, the end cap 58B extends axially along the filter axis 60 between and to a first end 106 of the end cap 58B and a second end 108 of the end cap 58B. The end cap 58B extends circumferentially about (e.g., completely around) the filter axis 60, providing the end cap 58B with a full-hoop body. The end cap 58B includes a tubular sidewall 110 and an endwall 112.

The sidewall 110 projects axially along the filter axis 60 out from the endwall 112 to the end cap first end 106. The sidewall 110 extends radially between and to an inner side 114 of the sidewall 110 and an outer side 116 of the end cap 58B. The sidewall inner side 114 forms an outer peripheral side of a receptacle 118 (e.g., bore) within the end cap 58B. This receptacle 118 projects axially along the filter axis 60 into the end cap 58B from the end cap first end 106 to the endwall 112.

This sidewall 110 may be circumferentially and/or axially uninterrupted. The sidewall 110 of FIG. 5, for example, is configured without any perforations, ports or other types of apertures extending radially therethrough.

The endwall 112 is connected to the sidewall 110. The endwall 112 is configured as a non-perforated wall. The endwall 112 thereby covers and encloses the receptacle 118.

The end cap 58A of FIG. 4 and the end cap 58B of FIG. 5 are each constructed from end cap material. This end cap material may be different than the filter element material. The end cap material, for example, may be polymer such as, but not limited to, polytetrafluoroethylene (e.g., Teflon® material). The present disclosure, however, is not limited to such an exemplary end cap material construction.

Figure 6:
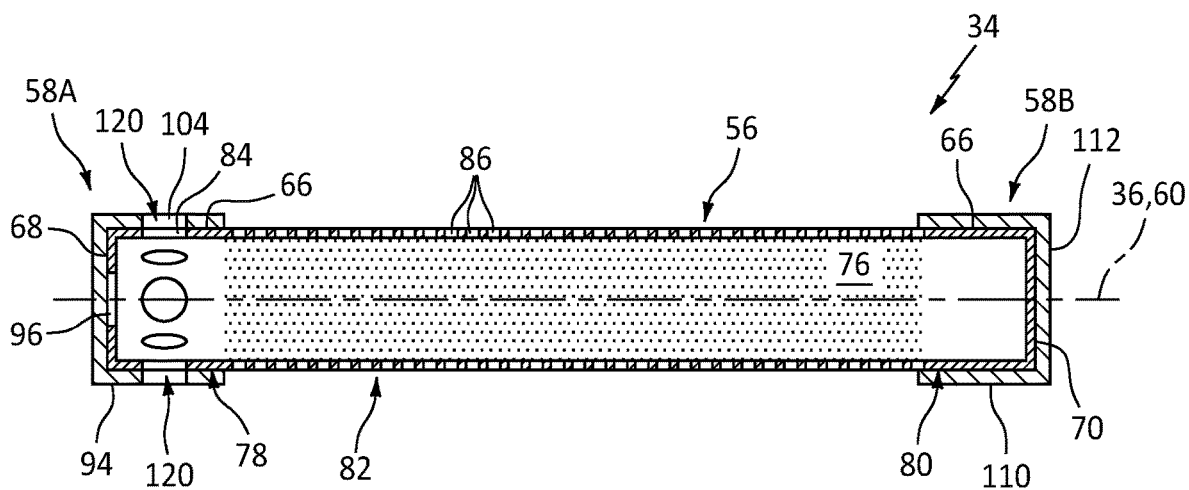
FIG. 6 is a side sectional illustration of the lubricant filter.

Referring to FIG. 6, the end cap 58A is mounted to/on the filter element 56. The end portion 78 of the filter element 56, for example, is mated with the end cap 58A. More particularly, the end portion 78 of FIG. 6 is inserted into the receptacle 102 (see FIG. 4) and abutted axially against (or positioned proximate) the endwall 96. The sidewall 94 thereby axially covers and circumscribes the end portion 78. The filter element 56 and its end portion 78 may be attached to the end cap 58A and its sidewall 94 by a mechanical connection (e.g., an interference fit) and/or a bonded (e.g., adhesive) connection. Each of the inlet ports 84 of FIG. 6 is partially or completely (e.g., axially and/or circumferentially) aligned with one or more of the inlet ports 104. These aligned inlet ports 84 and 104 may thereby form inlet passages 120 radially through the lubricant filter 34 to the filter bore 76.

The end cap 58B is mounted to/on the filter element 56. The end portion 80 of the filter element 56, for example, is mated with the end cap 58B. More particularly, the end portion 80 of FIG. 6 is inserted into the receptacle 118 (see FIG. 5) and abutted axially against (or positioned proximate) the endwall 112. The sidewall 110 thereby axially covers and circumscribes the end portion 80. The filter element 56 and its end portion 80 may be attached to the end cap 58B and its sidewall 110 by a mechanical connection (e.g., an interference fit) and/or a bonded (e.g., adhesive) connection.

Referring to FIG. 1, the lubricant filter 34 is mated with the journal bearing 24. More particularly, the lubricant filter 34 is inserted within the bearing bore 46. The lubricant filter 34 may be retained within the bearing bore 46 and/or located by one or more bore plugs 122A and 122B (generally referred to as "122"). The bore plug 122A is inserted into the bearing bore 46 next to the end cap 58A. This bore plug 122A may enclose and seal off an end of the bearing bore 46. The bore plug 122B is inserted into the bearing bore 46 next to the end cap 58B. This bore plug 122B may enclose and seal off another end of the bearing bore 46.

Figure 7:
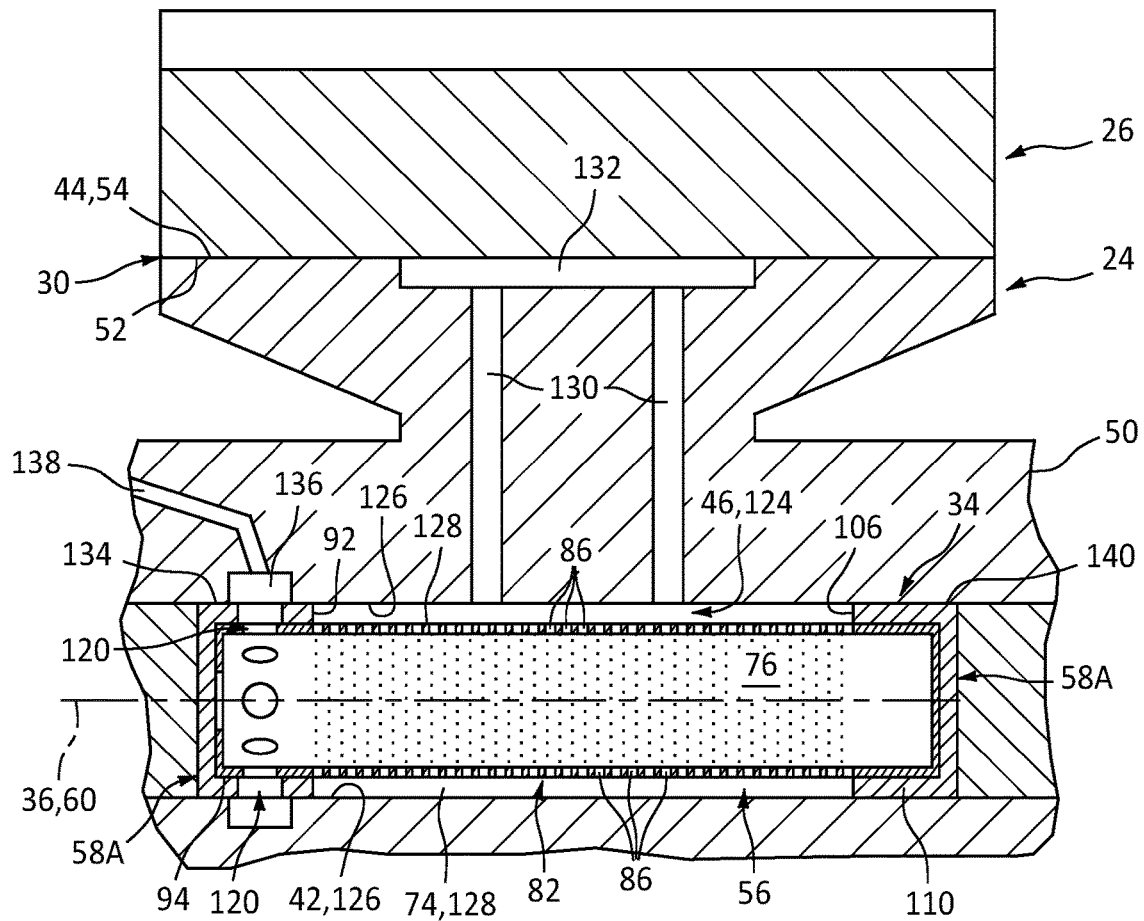
FIG. 7 is a side sectional illustration of a portion of the rotational equipment assembly.

Referring to FIG. 7, the filter element 56 and its intermediate (e.g., perforated) portion 82 are radially disposed away from the journal bearing 24 and its bearing inner side 42. More particularly, a cavity 124 is formed by and extends radially between a cylindrical inner surface 126 of the journal bearing 24 at its bearing inner side 42 and a cylindrical outer surface 128 of the filter element 56 at its element outer side 74. This cavity 124 extends axially along the journal bearing 24 and the filter element 56 between and to the end cap 58A and its end cap second end 92 and the end cap 58B and its end cap first end 106. The cavity 124 extends circumferentially about (e.g., completely around) the filter element 56, forming the cavity 124 as an annulus; e.g., an annular cavity. This cavity 124 fluidly couples the perforations 86 in the filter element 56 with one or more outlet passages 130 in the journal bearing 24. Each of these bearing outlet passages 130 extends radially through the journal bearing 24 from the bearing inner side 42 to, for example, a groove 132 at the bearing outer side 44.

The end cap 58A is sealingly engaged with the journal bearing 24 within the bearing bore 46. The end cap 58A and its sidewall 94, for example, are sealed radially against the bearing inner side 42 by an interference fit. More particularly, a cylindrical outer surface 134 of the end cap 58A is in radial contact with and pressed (e.g., seated) against the bearing inner surface 126. The end cap 58A and its sidewall 94 may thereby seal a radial gap between the filter element 56 and the journal bearing 24. However, the inlet passages 120 may be (e.g., axially) aligned with a (e.g., annular) channel 136 in the journal bearing 24 at its bearing inner side 42. This channel 136 may fluidly couple the inlet passages 120 with at least one feed passage 138. This feed passage 138 extends within the journal bearing 24 radially to the bearing inner side 42, and the feed passage 138 is fluidly coupled with the lubricant source 32 (see FIG. 1).

The end cap 58B is sealingly engaged with the journal bearing 24 within the bearing bore 46. The end cap 58B and its sidewall 110, for example, are sealed radially against the bearing inner side 42 by an interference fit. More particularly, a cylindrical outer surface 140 of the end cap 58B is in radial contact with and pressed (e.g., seated) against the bearing inner surface 126. The end cap 58B and its sidewall 110 may thereby seal a radial gap between the filter element 56 and the journal bearing 24.

With the foregoing arrangement, the structure of the lubricant filter 34 and its end caps 58 may arrange and seal the filter element 56 inline between the feed passage 138 and the outlet passages 130. The lubricant filter 34 may thereby be arranged with the journal bearing 24 in a circuit of the lubrication system 28 (see FIG. 1) without requiring additional seal elements such as ring seals; e.g., O-rings. The lubricant filter 34 may therefore be relatively compact and fit in bore sizes that may otherwise not accommodate a traditional lubricant filter with ring seals.

During rotational equipment operation, the lubricant is provided from the lubricant source 32 (see FIG. 1) (e.g., a reservoir and/or a pump) to the feed passage 138. The feed passage 138 directs the lubricant through the channel 136 and the inlet passages 120 into the filter bore 76. The lubricant within the filter bore 76 flows into the cavity 124 through the perforations 86. The outlet passages 130 direct the lubricant from the cavity 124 to the groove 132 for distribution at the interface 30 between the journal bearing 24 and the rotor 26. The lubricant filter 34 thereby filters the lubricant provided to the interface 30.

Figure 8:
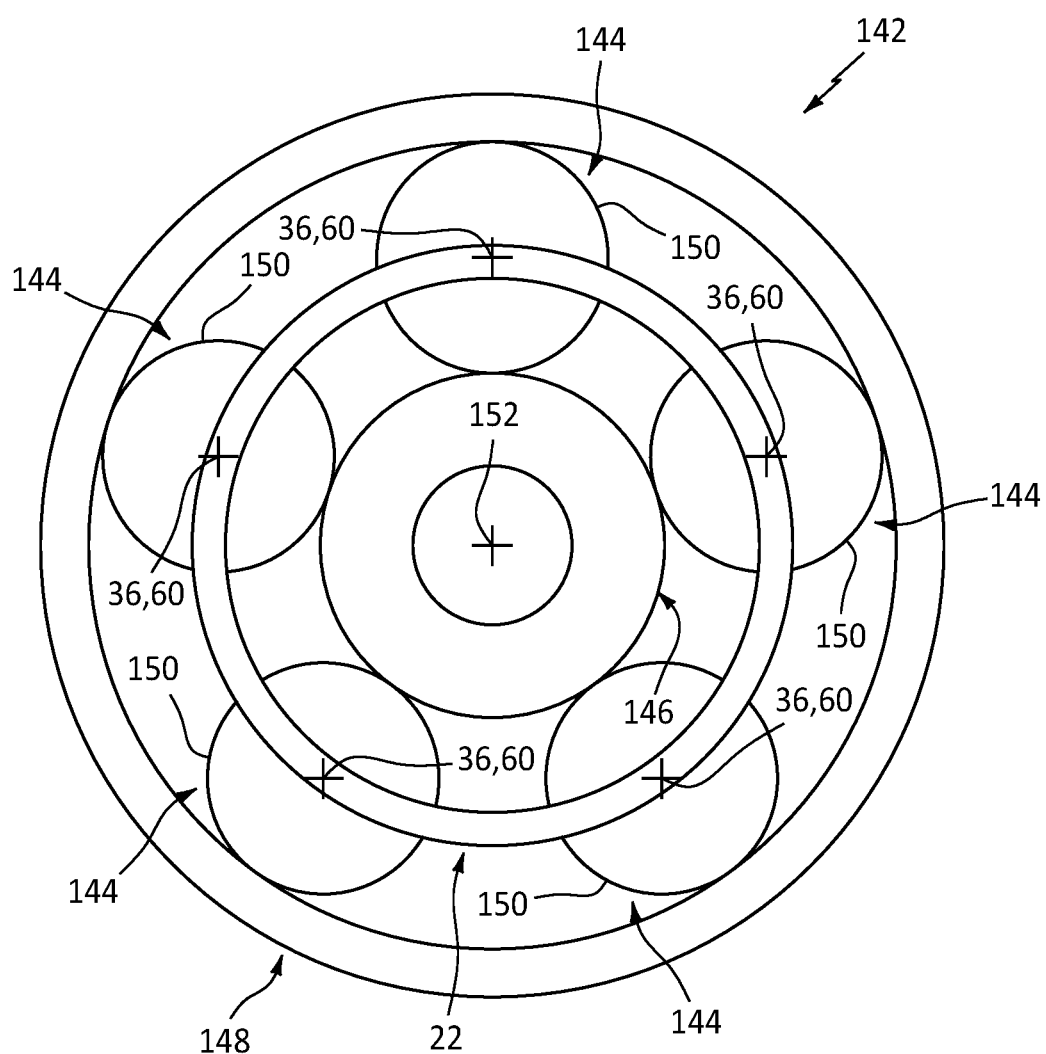
FIG. 8 is a schematic illustration of an epicyclic geartrain.

FIG. 8 illustrates an epicyclic geartrain 142 with which the rotational equipment assembly 20 may be included. This epicyclic geartrain 142 includes the support structure 22 and a plurality of rotor assemblies 144, where each of the rotor assemblies 144 of FIG. 1 includes a respective rotor 26, a respective journal bearing 24 and a respective lubricant filter 34. The epicyclic geartrain 142 of FIG. 8 also includes a center gear 146 (e.g., a sun gear) and a ring gear 148. Here, each rotor 26 of FIG. 1 is configured as and referred to below as an intermediate gear 150 (e.g., a planet or star gear). The intermediate gears 150 of FIG. 8 are distributed circumferentially about and meshed with the center gear 146, which center gear 146 is rotatable about an axial centerline 152. The ring gear 148 circumscribes and is meshed with the intermediate gears 150, which ring gear 148 of FIG. 8 is coaxial with (and may be rotatable about) the axial centerline 152. Where the epicyclic geartrain 142 is configured as a planetary geartrain, the center gear 146 may be coupled to an input (e.g., an input shaft) and the support structure 22 (e.g., a carrier) may be coupled to an output (e.g., an output shaft). Where the epicyclic geartrain 142 is configured as a star geartrain, the center gear 146 may be coupled to the input and the ring gear 148 may be coupled to the output. Of course, the input and the output may be reversed depending upon the desired speed differential.

Figure 9:
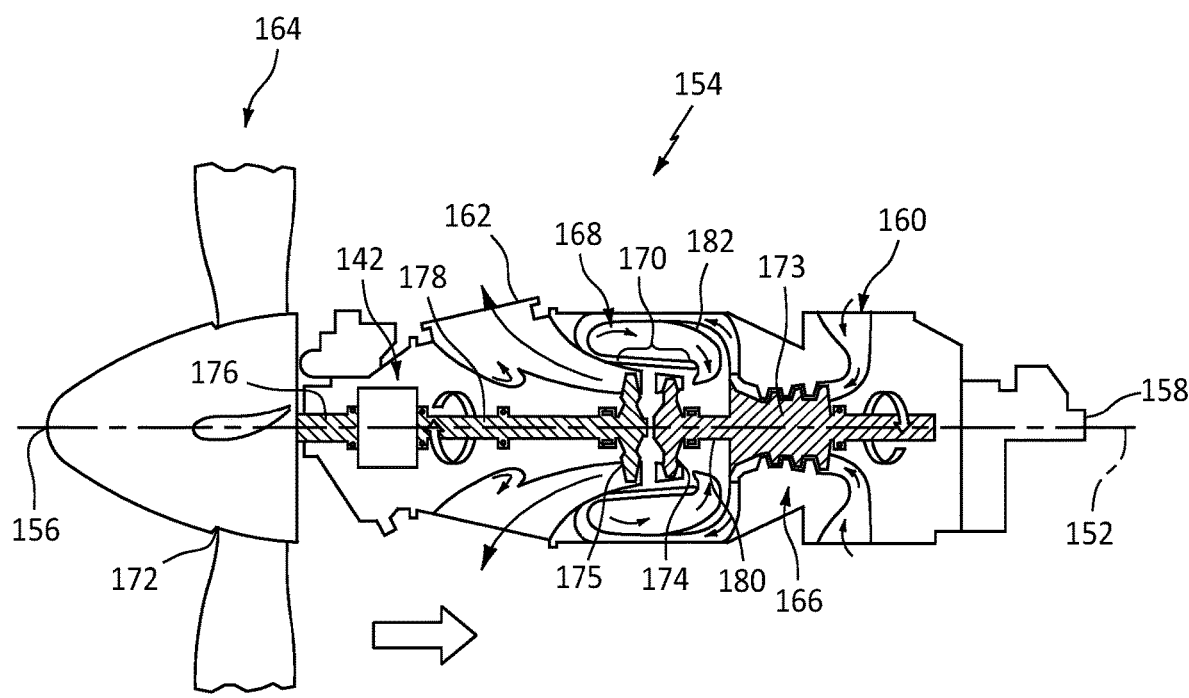
FIG. 9 is a schematic illustration of a turboprop gas turbine engine.

FIG. 9 illustrates an example of the turbine engine with which the rotational equipment assembly 20 may be configured. This turbine engine is configured as a turboprop gas turbine engine 154. This turbine engine 154 of FIG. 9 extends axially along the axial centerline 152 between a forward end 156 of the turbine engine 154 and an aft end 158 of the turbine engine 154. The turbine engine 154 of FIG. 9 includes an airflow inlet 160, an exhaust 162, a propulsor (e.g., a propeller) section 164, a compressor section 166, a combustor section 168 and a turbine section 170.

The airflow inlet 160 is towards the engine aft end 158, and aft of the turbine engine sections 164, 166, 168 and 170. The exhaust 162 is located towards the engine forward end 156, and axially between the turbine engine sections 164 and 170.

The propulsor section 164 includes a propulsor rotor 172; e.g., a propeller. The compressor section 166 includes a compressor rotor 173. The turbine section 170 includes a high pressure turbine (HPT) rotor 174 and a low pressure turbine (LPT) rotor 174, where the LPT rotor 175 may be referred to as a power turbine rotor and/or a free turbine rotor. Each of these turbine engine rotors 172-175 includes a plurality of rotor blades arranged circumferentially about and connected to one or more respective rotor disks or hubs.

The propulsor rotor 172 of FIG. 9 is connected to the LPT rotor 175 sequentially through a propulsor shaft 176, a geartrain (e.g., a transmission) and a low speed shaft 178, where the geartrain may be configured as the epicyclic geartrain 142 of FIG. 8. The compressor rotor 173 is connected to the HPT rotor 174 through a high speed shaft 180.

During turbine engine operation, air enters the turbine engine 154 through the airflow inlet 160. This air is directed into a core flowpath which extends sequentially through the engine sections 166, 168 and 170 (e.g., an engine core) to the exhaust 162. The air within this core flowpath may be referred to as "core air".

The core air is compressed by the compressor rotor 173 and directed into a combustion chamber of a combustor 182 in the combustor section 168. Fuel is injected into the combustion chamber and mixed with the compressed core air to provide a fuel-air mixture. This fuel-air mixture is ignited and combustion products thereof flow through and sequentially cause the HPT rotor 174 and the LPT rotor 175 to rotate. The rotation of the HPT rotor 174 drives rotation of the compressor rotor 173 and, thus, compression of air received from the airflow inlet 160. The rotation of the LPT rotor 175 drives rotation of the propulsor rotor 172, which propels air outside of the turbine engine 154 in an aft direction to provide forward aircraft thrust.

The epicyclic geartrain 142, the rotational equipment assembly 20 and/or its lubricant filter 34 may be included in various turbine engines other than the ones described above. The epicyclic geartrain 142, the rotational equipment assembly 20 and/or its lubricant filter 34, for example, may be included in a geared turbine engine where a gear train connects one or more shafts to one or more rotors in a fan section, a compressor section and/or any other engine section. Alternatively, the epicyclic geartrain 142, the rotational equipment assembly 20 and/or its lubricant filter 34 may be included in a turbine engine configured without a gear train; e.g., a direct drive turbine engine. The turbine engine may be configured with a single spool, with two spools, or with more than two spools. The turbine engine may be configured as a turbofan engine, a turbojet engine, a turboprop engine, a turboshaft engine, a propfan engine, a pusher fan engine, an auxiliary power unit (APU) or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
a journal bearing with an internal bearing bore; and
a filter arranged within the internal bearing bore, the filter including a tubular filter element and a first end cap;
the tubular filter element extending axially along an axis between a first end and a second end, and a perforated portion of the tubular filter element radially disposed away from the journal bearing by a cavity;
the first end cap mounted to the tubular filter element at the first end, and the first end cap sealed radially against the journal bearing by a first interference fit;
the first end cap including a tubular sidewall and an endwall, the tubular sidewall extending circumferentially about and mounted on the tubular filter element, the tubular sidewall including an end cap port, and the endwall covering the first end of the tubular filter element; and
the tubular filter element including an internal filter bore and a filter element port, and the filter element port fluidly coupling the end cap port with the internal filter bore.

2. The assembly of claim 1, wherein
the journal bearing includes a cylindrical inner surface; and
the first end cap includes a cylindrical outer surface pressed radially against the cylindrical inner surface to provide the first interference fit.

3. The assembly of claim 1, wherein the first end cap is sealed radially against the journal bearing without use of a ring seal.

4. The assembly of claim 1, wherein
the journal bearing includes a feed passage that extends to the internal bearing bore; and
the end cap port is fluidly coupled with the feed passage.

5. The assembly of claim 1, wherein the first end cap comprises a polymer.

6. The assembly of claim 1, wherein
the filter further includes a second end cap mounted to the tubular filter element at the second end; and
the second end cap is sealed radially against the journal bearing by a second interference fit.

7. The assembly of claim 6, wherein the cavity is an annular cavity that extends
radially between the tubular filter element and the journal bearing; and
axially between the first end cap and the second end cap.

8. The assembly of claim 1, wherein the tubular filter element comprises metal.

9. The assembly of claim 1, wherein
the journal bearing includes an outlet passage fluidly coupled with the cavity; and
the outlet passage extends radially through the journal bearing to an outer side of the journal bearing.

10. The assembly of claim 1, further comprising a gear mounted on and rotatably supported by the journal bearing.

11. The assembly of claim 10, further comprising a carrier to which the journal bearing is mounted.

12. The assembly of claim 1, further comprising an epicyclic geartrain including the journal bearing and the filter.

13. The assembly of claim 12, further comprising a turbine rotor coupled to an input of the epicyclic geartrain.

14. An assembly for a turbine engine, comprising:
a journal bearing with an internal bearing bore; and
a filter arranged within the internal bearing bore, the filter including a tubular filter element and a first end cap;
the tubular filter element extending axially along an axis between a first end and a second end, and a perforated portion of the tubular filter element radially disposed away from the journal bearing by a cavity;
the first end cap mounted to the tubular filter element at the first end, and the first end cap sealed radially against the journal bearing by a first interference fit;
the filter further including a second end cap mounted to the tubular filter element at the second end, and the second end cap sealed radially against the journal bearing by a second interference fit;
the journal bearing including a cylindrical inner surface;
a cylindrical surface of the first end cap pressed radially against the cylindrical inner surface to provide the first interference fit; and
a cylindrical surface of the second end cap pressed radially against the cylindrical inner surface to provide the second interference fit.

15. An assembly for a turbine engine, comprising:
a journal bearing including an internal bearing bore, a feed passage and an outlet passage, the feed passage extending radially within the journal bearing to the internal bearing bore, and the outlet passage extending radially within the journal bearing out from the internal bearing bore; and a filter arranged within the internal bearing bore with a sealed cavity radially between the filter and the journal bearing, the sealed cavity fluidly coupled with the outlet passage, the outlet passage extending radially within the journal bearing to the seal cavity, the filter including an internal filter bore, an inlet passage and a plurality of perforations, the inlet passage extending radially through the filter and fluidly coupling the feed passage to the internal filter bore, and the plurality of perforations extending radially through the filter and fluidly coupling the internal filter bore with the sealed cavity.

16. The assembly of claim 15, wherein the filter includes a tubular filter element, a first end cap and a second end cap;

the tubular filter element extends axially along an axis between a first end and a second end, and the tubular filter element is radially disposed away from the journal bearing by the sealed cavity;

the first end cap is mounted on the tubular filter element at the first end, and the first end cap sealingly engages the journal bearing; and the second end cap is mounted on the tubular filter element at the second end, and the second end cap sealingly engages the journal bearing.

17. A filter, comprising:

a tubular filter element extending axially along an axis between a first end and a second end, the tubular filter element including a first end portion at the first end, a second end portion at the second end, and a perforated portion axially between the first end portion and the second end portion, and the tubular filter element comprising metal;

a first end cap including a first tubular sidewall and a first endwall, the first tubular sidewall circumscribing and mounted on the first end portion, and the first endwall connected to the first tubular sidewall and covering the first end, the first end cap comprising a polymer, wherein the first tubular sidewall includes an end cap port; and a second end cap including a second tubular sidewall and a second endwall, the second tubular sidewall circumscribing and mounted on the second end portion, and the second endwall connected to the second tubular sidewall and covering the second end, the second end cap comprising a polymer.

\* \* \* \* \*